Figure 1:
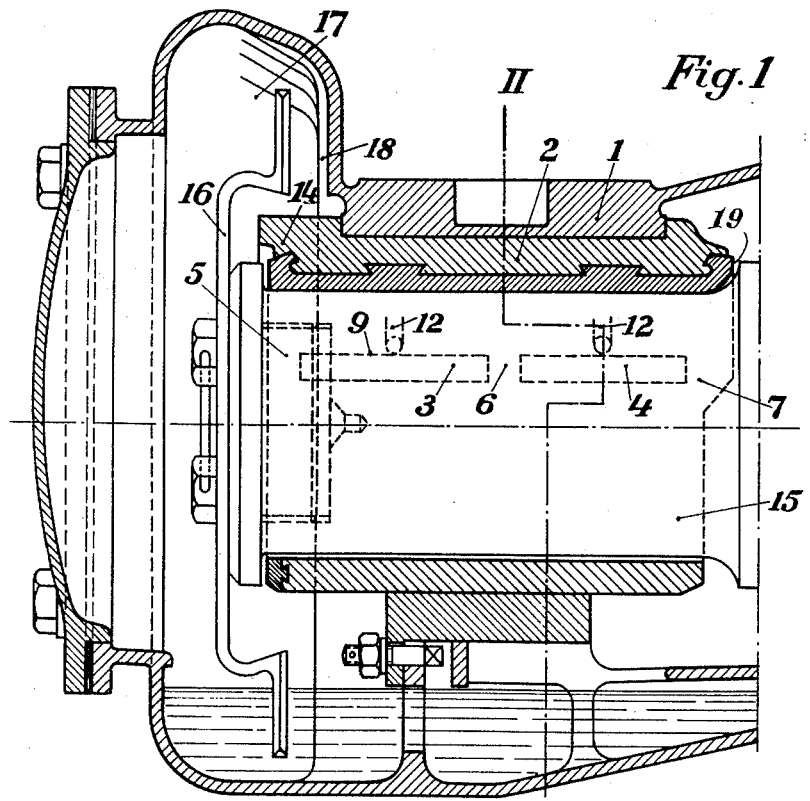

Dec. 5, 1933.          V. A. BARY          1,937,741

AXLE BEARING

Filed Feb. 16, 1931

Inventor
V. A. BARY
By Joseph Hirschwald
Attorney

Patented Dec. 5, 1933

1,937,741

UNITED STATES PATENT OFFICE 1,937,741

AXLE BEARING

Victor Alexander Bary, London, England

Application February 16, 1931, Serial No. 516,149, and in Great Britain March 3, 1930

4 Claims. (Cl. 308—86)

Axle-bearings, in particular for railway vehicles, in which the lubricant is conducted to fall freely on to the journal from a drip edge have previously been proposed. This method of conducting the lubricant has very great advantages. In the first place the running surface of the axle-brass or step is entirely free from all lubricant conducting recesses, grooves or the like, so that the film of lubricant between the journal and axle-brass is not interrupted. This film of lubricant is formed since the rotating journal carries with it the lubricant which drips on to it and conducts it into a wedge-like space between the axle-brass and journal, the brass being of somewhat larger radius than the journal. The lubricant is in such space thoroughly rolled out and the formation of the film of lubricant thus occurs which replaces the friction between metals by the preferable liquid friction. The superfluous lubricant which is not used to form the film of lubricant runs down the wall of the axle-brass which forms the wedge-like space, reaches the drip edge, drips down and again indirectly reaches the journal in a circulatory course, the operation being repeated with the addition of fresh lubricant. In order however that the drops of lubricant might fall freely on to the journal, the axle brass in which the drip edge is located had to be of a width which was somewhat smaller than that of the greatest journal diameter. This therefore resulted in the axle-brass being relatively narrow. In order nevertheless to maintain the necessary stability of the whole arrangement, a lower lubricating brass was fitted and this was extended laterally above the centre of the journal. In this way an approximately closed axle-brass, which was however in all cases divided, was obtained and this overcame the drawbacks of the shortened brass from which the lubricant dripped. Now the present invention is based on the recognition that it is possible to maintain the advantages of the above-mentioned drip lubrication edges and yet to provide an entirely stable, closed, annular axle-brass. The problem is solved, according to the invention by forming the drip edges by means of slot-like or slit-like apertures in closed, annular, one piece axle-brasses. With the arrangement of the slots, owing to the lateral connecting bridge-like parts which bound the slots, the body of the axle-brass remains closed, annular and in one piece. Preferably, however, further connecting pieces are arranged between the separate apertures in the axle-brass which form the drip edge. One or more of the surfaces which bound the apertures and adjoin the inner surface of the axle-brass are employed for conducting the lubricant and these lubricant-conducting surfaces, when viewed from the drip-edge, are upwardly inclined. The inner surface of the axle-brass which in conjunction with one of the said boundary surface constitutes the drip edge forms in the vicinity of the same a plane which is tangential to the surface of the journal, so that a wedge-like space for the entry of the lubricant is formed between it and the surface of the journal. The lubricant itself is first conveyed to the upper side of the axle-brass by a lubricant transfer device, for example a centrifugal conveyor disc or bar, and is conducted thence to the boundary surface forming the drip edge by way of recesses, channels or slits in or on the axle-brass, in or on the axle-box or in separate conduits.

Figure 2:
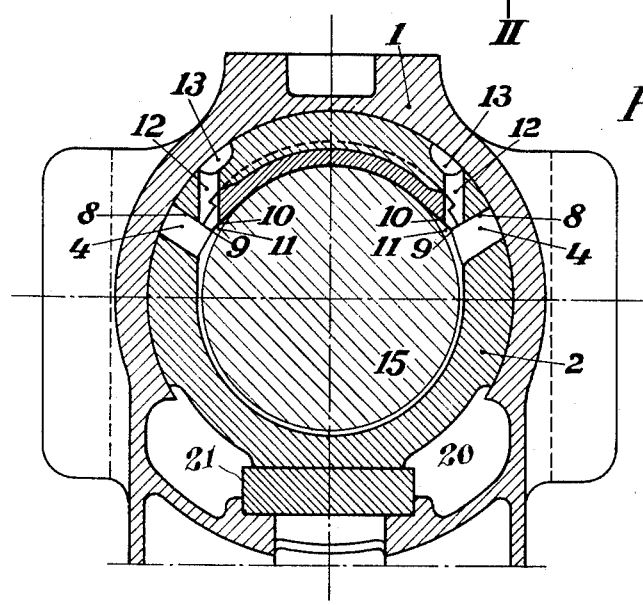

A constructional embodiment of the invention is illustrated by way of example in the accompanying drawing, in which Fig. 1 is a vertical longitudinal section through the axle-bearing, and Fig. 2 is a vertical cross-section on the line II—II of Fig. 1.

Referring to the drawing, in both figures 1 represents the axle-box in which in accordance with the invention the closed, annular, one-piece axle-brass 2 is carried. The axle-brass 2 is provided with four slot-like apertures 3 and 4, two at each side, so that connecting bridge-portions 5, 6 and 7 remain and the annular, one-piece formation of the axle-brass is thereby maintained. It is advantageous so to cut the slots 3, 4 that they are directed toward the center of the journal. The surfaces 8 which bounds the apertures 3 and 4 and adjoin the inner surface of the axle-brass form in conjunction with the said inner surface the drip edges 9. The inner surface of the axle-brass which, in conjunction with the boundary surfaces 8, forms the drip edges runs in the vicinity of the drip edge as a plane 10 tangential to the journal surface, so that a wedge-like space 11 for the entry of the lubricant is formed. The boundary surfaces 8 are themselves upwardly inclined, when viewed from the drip edge 9, so that they can serve the purpose of conducting the lubricant to the drip edge. The lubricant is conducted to the boundary surfaces 8 by way of lubricant conducting passages 12, which are in connection by means of grooves 13 in the outside of the axle-brass with a lubricant collecting space or recess arranged in the forward, widened part 14 of the axle brass 2. The lubricant reaches this collecting space by means of a centrifugal conveyor device 16 which rotates with the axle-journal 15 and is in part thrown off by the said device directly into the collecting space and in part collects in the part 17 of the axle-box above the conveyor device and is directed by the conducting grooves 18 to the collecting space in the part 14 of the axle-brass.

The brass is inserted into the bearing by first rotating it for 180° from the position shown in the drawing and then moving it axially into the housing, until it has been fitted within the central portion of the housing, whereupon it is rotated into the position illustrated. To allow clearance for the shoulder 19, the internal webbing of the housing is cut away as shown at 20. The brass is supported at its bottom by a member 21 positioned in the cutout 20. The cutout extends for less than half the circumference of the housing bore and the supporting member 21 is so arranged and shaped, as is also the bottom of the brass, that it holds the brass against rotation.

I claim:

1. In an axle particularly for railway vehicles, the combination comprising an axle box, an axle journal, an integral annular axle brass for said axle journal having a relatively long, substantially horizontal slot extending to the outer surface of the brass, said slot being located above the journal axis and between the ends of the brass, so that bridge portions of the full thickness of the brass unite the portions of the brass above and below the slot at the ends of the slot, said slot being directed upwardly from the inner surface of the brass, said brass being provided with a dripping edge overlying the journal surface and defined by the upper surface of said slot and by the upwardly inclined inner surface of the brass, so that lubricant flowing along such surfaces is compelled to drip off said edge onto the journal, the inner surface of the brass being turned away from the journal at said edge so that the latter is spaced from the journal surface, and means for feeding said drip edge with lubricant.

2. An axle bearing according to claim 1, wherein said bearing brass is received in a cylindrical recess in the housing, the walls defining such cylindrical recess having a cutout, and a supporting member for said bearing brass arranged in such cutout.

3. An axle bearing according to claim 1, wherein said bearing brass is received in a cylindrical recess in the housing, the walls defining such cylindrical recess having a cutout extending less than half the circumference of the housing bore, and a supporting member for said bearing brass arranged in such cutout to hold the brass against rotation.

4. An axle bearing according to claim 1 wherein said slot includes two sections separated from each other by a bridge portion which connects the upper part of the bearing brass with the lower part of such brass.

VICTOR ALEXANDER BARY.